United States Patent
Loucaides et al.

(10) Patent No.: US 10,692,135 B2
(45) Date of Patent: Jun. 23, 2020

(54) SYSTEM AND METHOD FOR PROCESS SCHEDULING

(75) Inventors: Alex Loucaides, Bedfordshire (GB); Daniel Clayden, Hertfordshire (GB); Phillip Carter, Islington (GB); Mark Addison, Redhill Surrey (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 939 days.

(21) Appl. No.: 13/569,617

(22) Filed: Aug. 8, 2012
(Under 37 CFR 1.47)

(65) Prior Publication Data

US 2013/0013532 A1     Jan. 10, 2013

Related U.S. Application Data

(63) Continuation of application No. 13/112,473, filed on May 20, 2011, now Pat. No. 8,266,036, which is a
(Continued)

(51) Int. Cl.
| | |
|---|---|
| *G06Q 40/00* | (2012.01) |
| *G06Q 40/02* | (2012.01) |
| *G06Q 40/06* | (2012.01) |

(52) U.S. Cl.
CPC .......... *G06Q 40/02* (2013.01); *G06Q 40/00* (2013.01); *G06Q 40/06* (2013.01)

(58) Field of Classification Search
USPC ........................................................ 705/35
See application file for complete search history.

(56) References Cited

U.S. PATENT DOCUMENTS

| | | |
|---|---|---|
| 4,751,702 A | 6/1988 | Beier et al. |
| 5,027,269 A | 6/1991 | Grant et al. |
| (Continued) | | |

FOREIGN PATENT DOCUMENTS

| | | |
|---|---|---|
| EP | 1560169 | 1/2005 |
| WO | WO 01/35209 | 5/2001 |
| (Continued) | | |

OTHER PUBLICATIONS

Computers & Mathematics with Applications; vol. 37, Issues 4-5, Feb.-Mar. 1999, pp. 163-179; Sequential and parallel algorithms for global minimizing functions with Lipschitzian derivatives; V.P. Gergel.*

(Continued)

*Primary Examiner* — Abhishek Vyas
(74) *Attorney, Agent, or Firm* — Greenblum & Bernstein, P.L.C.

(57) ABSTRACT

A method for scheduling processing of an instrument. The method receives instrument information, selects an instrument category for the instrument based on the instrument information, the selected instrument category having a calculation set, assigns the instrument to a job corresponding to the calculation set of the selected instrument category; and sends the job to a computing resource. In another aspect, the method also receives a purpose identifier, and chooses the calculation set from two or more calculation sets of the selected instrument category based on the purpose identifier. In another aspect, the calculation set includes two or more calculation sub-sets, each calculation sub-set having a job priority, and the method includes assigning the instrument to two or more jobs corresponding to each of the two or more calculation sub-sets.

20 Claims, 2 Drawing Sheets

Related U.S. Application Data continuation of application No. 10/338,958, filed on Jan. 7, 2003, now Pat. No. 8,032,439.

(56) References Cited

U.S. PATENT DOCUMENTS

| | | |
|---|---|---|
| 5,159,687 A | 10/1992 | Richburg |
| 5,301,320 A | 4/1994 | McAtee et al. |
| 5,325,527 A | 6/1994 | Cwikowski et al. |
| 5,499,371 A | 3/1996 | Henninger et al. |
| 5,539,885 A | 7/1996 | Ono et al. |
| 5,553,235 A | 9/1996 | Chen et al. |
| 5,566,297 A | 10/1996 | Devarakonda et al. |
| 5,594,863 A | 1/1997 | Stiles |
| 5,630,047 A | 5/1997 | Wang |
| 5,630,173 A | 5/1997 | Oprescu |
| 5,673,403 A | 9/1997 | Brown et al. |
| 5,689,698 A | 11/1997 | Jones et al. |
| 5,692,181 A | 11/1997 | Anand et al. |
| 5,712,971 A | 1/1998 | Stanfill et al. |
| 5,734,887 A | 3/1998 | Kingberg et al. |
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A | 8/1998 | Holmes |
| 5,801,689 A | 9/1998 | Huntsman |
| 5,806,075 A | 9/1998 | Jain et al. |
| 5,845,292 A | 12/1998 | Bohannon et al. |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,946,667 A | 8/1999 | Tull, Jr. et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,014,760 A * | 1/2000 | Silva ............... G01R 31/31830 714/46 |
| 6,046,742 A | 4/2000 | Chari |
| 6,052,456 A | 4/2000 | Huang |
| 6,061,062 A * | 5/2000 | Venolia ............... G06F 3/0481 715/856 |
| 6,061,662 A * | 5/2000 | Makivic .................. 705/36 R |
| 6,065,009 A | 5/2000 | Leymann et al. |
| 6,092,056 A | 7/2000 | Tull, Jr. et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,188,400 B1 | 2/2001 | House et al. |
| 6,195,676 B1 | 2/2001 | Spix et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,256,635 B1 | 7/2001 | Arrouye et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,298,353 B1 | 10/2001 | Apte |
| 6,304,871 B1 | 10/2001 | Gajda et al. |
| 6,311,320 B1 | 10/2001 | Jibbe |
| 6,314,430 B1 | 11/2001 | Chang |
| 6,317,738 B1 | 11/2001 | Lohman et al. |
| 6,324,525 B1 | 11/2001 | Kramer et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,453,310 B1 | 9/2002 | Zander |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brien et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przybylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,681,380 B1 | 1/2004 | Britton et al. |
| 6,697,835 B1 | 2/2004 | Hanson et al. |
| 6,701,514 B1 | 3/2004 | Haswell et al. |
| 6,714,219 B2 | 3/2004 | Lindhorst et al. |
| 6,859,926 B1 * | 2/2005 | Brenner ............... G06F 9/5038 718/100 |
| 7,093,004 B2 * | 8/2006 | Bernardin et al. ............ 709/219 |
| 7,433,842 B2 | 10/2008 | Toffey |
| 7,444,301 B2 | 10/2008 | Conklin et al. |
| 7,769,678 B2 | 8/2010 | Toffey |
| 7,882,019 B2 | 2/2011 | Toffey |
| 8,156,034 B2 | 4/2012 | Conklin et al. |
| 8,370,179 B2 | 2/2013 | Foley et al. |
| 8,370,265 B2 | 2/2013 | Coulter et al. |
| 8,374,945 B2 | 2/2013 | Mercier et al. |
| 8,407,122 B2 | 3/2013 | Parsons et al. |
| 2001/0011243 A1 * | 8/2001 | Dembo et al. .................. 705/36 |
| 2001/0020255 A1 | 9/2001 | Hofmann et al. |
| 2001/0029604 A1 | 10/2001 | Dreyband et al. |
| 2001/0032192 A1 | 10/2001 | Putta et al. |
| 2002/0010867 A1 | 1/2002 | Schaefer et al. |
| 2002/0046239 A1 | 4/2002 | Stawikowski et al. |
| 2002/0062475 A1 | 5/2002 | Iborra et al. |
| 2002/0069192 A1 | 6/2002 | Aegerter |
| 2002/0078115 A1 | 6/2002 | Poff et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124113 A1 | 9/2002 | Gargya et al. |
| 2002/0129096 A1 | 9/2002 | Mansour et al. |
| 2002/0133579 A1 | 9/2002 | Bernhardt et al. |

(56) References Cited

U.S. PATENT DOCUMENTS

| | | |
|---|---|---|
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0027561 A1 | 2/2003 | Iyer |
| 2003/0028555 A1 | 2/2003 | Young et al. |
| 2003/0033121 A1 | 2/2003 | Chen et al. |
| 2003/0033159 A1 | 2/2003 | Altomare |
| 2003/0036809 A1 | 2/2003 | Landman et al. |
| 2003/0046317 A1 | 3/2003 | Cseri et al. |
| 2003/0050897 A1 | 3/2003 | Altomare |
| 2003/0069907 A1 | 4/2003 | Moreau et al. |
| 2003/0084067 A1 | 5/2003 | Obiaya |
| 2003/0093574 A1 | 5/2003 | Fablet et al. |
| 2003/0097383 A1 | 5/2003 | Smirnov et al. |
| 2003/0140045 A1 | 7/2003 | Heninger et al. |
| 2003/0160813 A1 | 8/2003 | Raju |
| 2003/0191795 A1* | 10/2003 | Bernardin et al. ............ 709/105 |
| 2003/0217033 A1 | 11/2003 | Sandler et al. |
| 2004/0073506 A1 | 4/2004 | Tull, Jr. et al. |
| 2004/0083158 A1* | 4/2004 | Addison ................ G06Q 30/06 705/37 |
| 2004/0107183 A1 | 6/2004 | Mangan |
| 2004/0230587 A1 | 11/2004 | Doddington |
| 2005/0030555 A1 | 2/2005 | Phenix et al. |
| 2005/0228856 A1* | 10/2005 | Swildens et al. ............ 709/200 |
| 2005/0267833 A1* | 12/2005 | Brodersen ............. G06Q 40/04 705/37 |
| 2007/0143116 A1* | 6/2007 | De Armas et al. ........ 704/270.1 |
| 2012/0310858 A1 | 12/2012 | Stanley |
| 2012/0314931 A1 | 12/2012 | Bonds et al. |
| 2013/0036055 A1 | 2/2013 | Mears |

FOREIGN PATENT DOCUMENTS

| | | |
|---|---|---|
| WO | WO 01/63529 | 8/2001 |
| WO | 02/46916 | 6/2002 |
| WO | WO 02/46980 | 6/2002 |
| WO | 03/001373 | 1/2003 |
| WO | WO2011057139 | 5/2011 |

OTHER PUBLICATIONS

Srinivasan, A., "Parallel and distributed computing issues in pricing financial derivatives through quasi Monte Carlo," Parallel and Distributed Processing Symposium., Proceedings International, IPDPS 2002, Abstracts and Cd-Rom , vol., No., pp. 6 pp,, Apr. 15-19, 2001 doi: 10.1109/IPDPS.2002.1015484.*

Journal of Financial Services Research 12:2/3 201±242 (1997); # 1997 Kluwer Academic Publishers Evaluating Value at Risk Methodologies: Accuracy versus Computational Time; Matthew Pritsker.*

Scheduling of tasks for distributed processors; Ravi Mehrotra; Carnegie Mellon University (Year: 1984).*

Task Scheduling, Rewini, Ali; Dec. 1995 (Year: 1995).*

Unknown, Conjuring up Com through scripting, Jul. 2000.

Rennhackkamp, One for the Road: Sybase's Adaptive Server Anywhere 6.0, Sep. 1998.

Mcclanahan, PowerBuilder3.0, Oct. 1993.

White, Quantum Spc/Dc Script File (.tdf) Definition Instruction Guide, 2004.

Myers, Scripting Graphical Applications by Demonstration, Apr. 1998.

Ousterhoust, Scripting Higher Level Programming, May 1997.

* cited by examiner

SYSTEM AND METHOD FOR PROCESS SCHEDULING

This application is a continuation of U.S. patent application Ser. No. 13/112,473, filed on May 20, 2011, which is a continuation of U.S. patent application Ser. No 10/338,958, filed on Jan. 7, 2003, now U.S. Pat. No. 8,032,439. All of the above-identified applications are incorporated herein by reference.

BACKGROUND

Technical Field

The present disclosures relates to a system and method for process scheduling. More specifically, the present disclosure relates to a method and system for scheduling processes for calculation across one or more processing engines.

Description of the Related Art

Financial and investment organizations utilize computer-generated valuations of their trading position for a variety of purposes, such as, for example, to determine profit/loss and to manage market risk and exposure. Valuations may be performed as selected by a valuation request, which may include information identifying the financial instruments to be valuated as well as a context of the valuation. A valuation request may specify the valuation of all financial instruments for an organization, or may be something as simple as the valuation of a single financial instrument.

Valuation results may be generated by a process, such as a valuation engine, which may perform one or more calculations using mathematical models. Some valuations may be performed through the execution and invocation of one or more processes.

Each valuation calculation requires processing time, and, as a result, the number of calculations which may be performed may be limited by the availability of computing resources, such as the number of available computers and the amount of computing time available for processing. In some cases, lack of sufficient computing resources may adversely impact an organization's ability to determine and manage market risk.

In response, processes may support a valuation request including an indication to process sub-parts of the valuation request, thereby permitting segmentation of the calculation and creating the possibility and need for a scheduler to schedule and organize these calculations. If a valuation request is split into sub-parts, then each sub-part may be sent as a job to be executed, for example, in parallel, across a number of different machines and/or processes, which may be directed by the scheduler. The scheduler may use criteria to determine the most optimal schedule for submitting jobs to valuation engines that perform the requisite calculations for the valuations.

SUMMARY

The present disclosure relates to a method for scheduling processing of instruments, comprises, receiving instrument information, selecting an instrument category for the instrument based on the instrument information, the selected instrument category may have a calculation set, assigning the instrument to a job corresponding to the calculation set of the selected instrument category, and sending the job to a computing resource. The step of receiving may include receiving a purpose identifier, and the step of selecting may include choosing the calculation set from two or more calculation sets of the selected instrument category based on the purpose identifier. The calculation set may include two or more calculation sub-sets, each calculation sub-set having a job priority, and the step of assigning may further include assigning the instrument to two or more jobs corresponding to each of the two or more calculation sub-sets.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
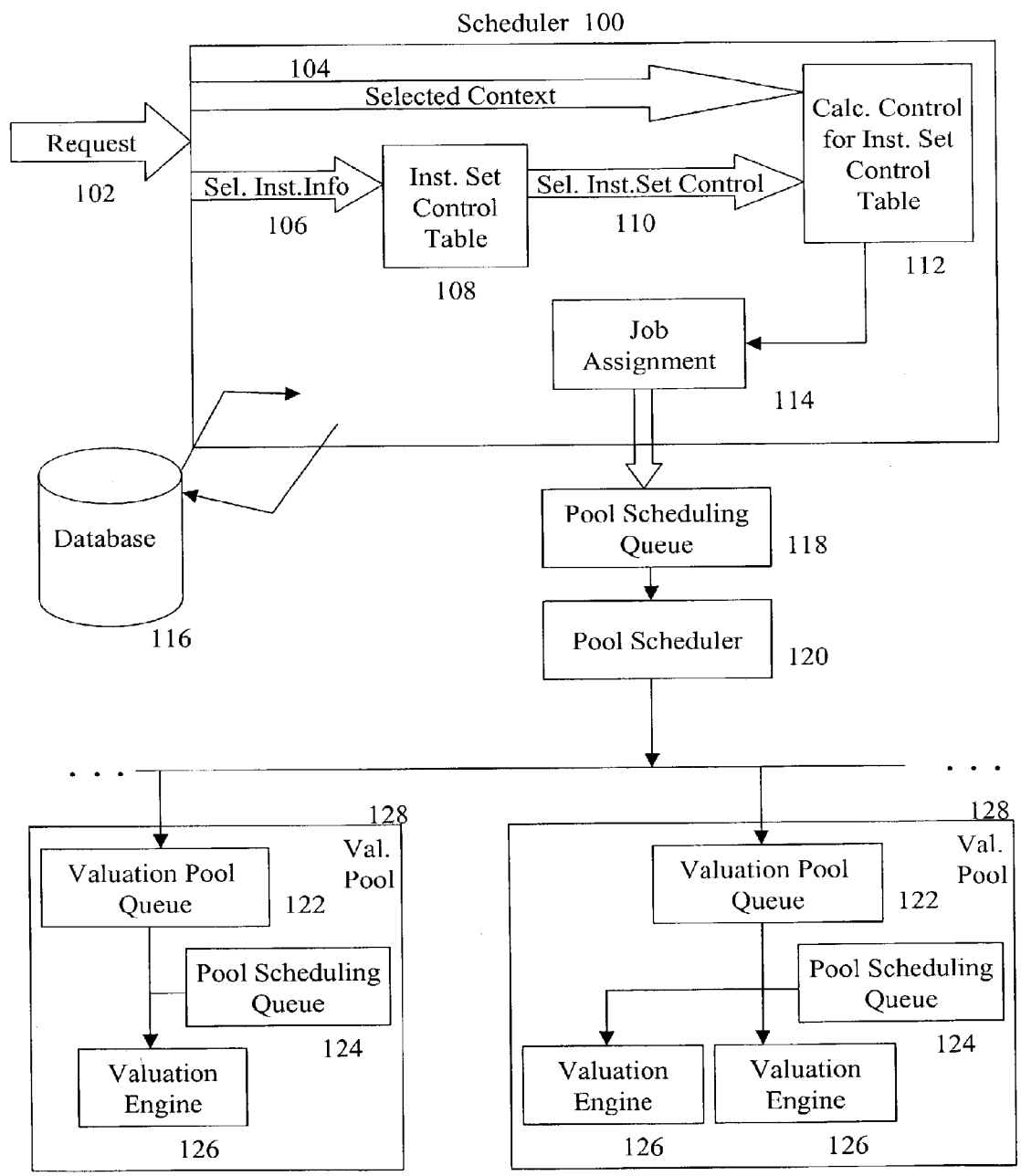
FIG. 1 shows a block diagram of the system and method for process scheduling according to an aspect of the present disclosure.

In describing a preferred embodiment of the present disclosure illustrated in the drawings, specific terminology is employed for sake of clarity. The present disclosure is not intended to be limited to the specific terminology so selected, and it is to be understood that each specific element includes all technical equivalents which operate in a similar manner.

The system as described may be implemented using a high-level programming language, such as Java, and, therefore, any system supporting the Java Platform, and including network communication capabilities may support the distributed application aspects of the system and method of the present disclosure.

FIG. 1 shows a block diagram of the system and method for process scheduling according to an aspect of the present disclosure. In FIG. 1, a Scheduler 100 may receive a Request 102 including a Selected Context 104 and Selected Instrument Information 106. Additional information corresponding to Selected Instrument Information 106 may be retrieved from a Database 116. An Instrument Set Control Table 108 may be used to choose a Selected Instrument Set Control 110 based on the Selected Instrument Information 106. A Calculation Control for Instrument Set Control Table 112 may be used for Job Assignment 114 based on the Selected Context 104, Selected Instrument Set Control 110, and may be based on Selected Instrument Information 106 and other data retrieved from Database 116. Once received by Pool Scheduling Queue 118, Jobs may be passed by Pool Scheduler 120, to Valuation Pool Queue 122 corresponding to the appropriate Valuation Engine 126 and controlled by Pool Scheduling Queue 124. A Valuation Pool 128 may include one or more Valuation Engines 126, and corresponding Valuation Pool Queue 122, and Valuation Manager 124.

Figure 2:
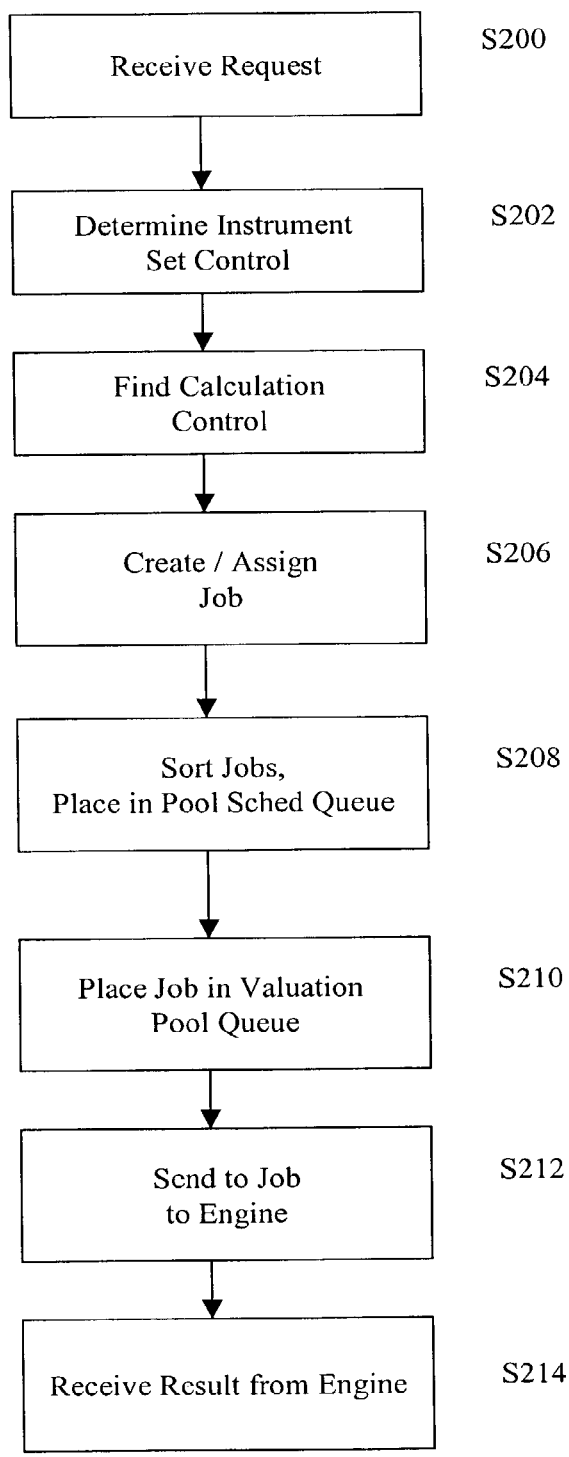
FIG. 2 shows a flowchart of the system and method for process scheduling according to an aspect of the present disclosure.

FIG. 2 shows a flowchart of the system and method for process scheduling according to an aspect of the present disclosure.

In one aspect of the system and method of the present disclosure, either prior to or immediately after receipt of Request 102 in Step S200, the system may cache a configuration used to separate the financial instruments into Jobs.

A list of Valuation Pools 128 may be retrieved from the Database 116 and stored in a data structure, for example, a hashmap. A hashmap is a container which may associate a key and an object, and which applies a hash function to the key, providing a near unique 32-bit hash value used to provide the internal address.

A list of Instrument Sets for each Valuation Pool 128 may be retrieved and added to the hashmap. An Instrument Set may contain a list of financial instruments and corresponding types and the corresponding Compute Index thereby providing scope for handling instruments differently, for example, depending upon calculation complexity and time requirements.

A hashmap may be created whose key is the Context and the value is a Valuation Pool 128. Therefore, given the key Context, the corresponding Valuation Pool 128 may be retrieved.

The Valuation Pool 128 may be a list of Pool Objects given the Context is used as the key, and may be a grouped by Context. The Valuation Pool 128 may be used to schedule the distribution of Jobs to the Valuation Pool Queue 122 prior to Valuation Engine 126. Each Pool Object may contain, for example, a list of the computer hosts and ports which execute the Valuation Engines.

In Step S200, the Scheduler receives a Request 102 to determine the value the Selected Instrument. Request 102 includes Selected Instrument Information 106 identifying one or more Selected Instruments and a Selected Context 104. The Selected Instrument may include one or more financial instruments and may be referenced individually or in a set, such as a portfolio.

In one aspect of the system and method of the present disclosure, the Scheduler 100 may retrieve from a Database 116 a Financial Instrument Identification Number, an Instrument Type, an Option Class (if the financial instrument is an option), and a Compute Index, related to the Selected Instrument identified by the Selected Instrument Information 106. In another aspect of the system and method of the present disclosure, this information may be included in the Request 102.

An Instrument Type may describe the type of financial instrument, for example, stock (STK), index (IND), or option (OTC), swap, or other financial product. If the Instrument Type is Option, then Option Class describes the type of option, for example, rainbow, vanilla, etc. For example, a Rainbow option (RBW) is an option with a payout linked to the weighted performance of two or more financial instruments or indexes.

A Context may describe a purpose of calculations to be performed for the Selected Instrument. In one aspect of the system and method of the present disclosure, for example, Context serves as a temporal designator of the information used for the calculation and may exist for calculations performed using overnight information ("Overnight"), trading day information ("Intraday"), and end of trading day information ("End of Day"). Because a calculation may be performed at any time of day, the Context may not correspond to the actual time of day in which the calculation takes place.

Intraday Context may use corresponding current date and current market information. In one aspect of the system and method of the present disclosure, Intraday Context may be selected, for example, when the volatility of a financial instrument increases or decreases, as it may be desirable to determine the impact on current positions. Intraday Context may be selected to perform calculation for all instruments derived from a specific underlying instrument. End of Day Context may use the current date as well as end of day market information. In one aspect of the system and method of the present disclosure, for example, finding profit and loss for a trading day, may be calculated using End of Day Context. Overnight Context may use the date for the next trading day as well as end of day market information.

In Step S202, the Scheduler 100 determines a Selected Instrument Set Control 110 to use based on the Selected Instrument. Instrument Set Control Table 108, as shown in Table 1, may include one or more Instrument Set Controls, each of which may include configuration information regarding how one or more instruments may be grouped for calculation. The Instrument Set Control may include, for example, an Instrument Set Control Identification Number, Instrument Type, Option Class, and Compute Index.

According to one aspect of the system and method of the present disclosure, the Compute Index, maximum number of instruments included per Job, and Job Rank may be changed in order to alter performance.

The Instrument Set Control Identification Number may be a unique identifier assigned to the Instrument Set Control. The Instrument Type and Option Class may identify the types of financial instruments which may be scheduled for processing using an Instrument Set Control.

The Compute Index may be a number assigned to a financial instrument based on its computational intensity, that is, how difficult it is to compute a valuation for.

TABLE 1

Instrument Set Control Table

| Instrument Set Control ID | Instrument Type | Option Class | Compute Index |
| --- | --- | --- | --- |
| 1 | ALL | NULL | 0 |
| 2 | OTC | VAN | 1 |
| 3 | OTC | VAN | 5 |

The Scheduler 100 may determine the Instrument Set Control to use for the Selected Instrument in the following manner. In one aspect of the system and method of the present disclosure, the Scheduler 100 may choose an Instrument Set Control for a Selected Instrument when the Instrument Type and Option Class of the Selected Instrument match those respective elements of an Instrument Set Control. In another aspect of the system and method of the present disclosure, the Scheduler 100 may first search for Instrument Set Controls having exact matches for Instrument Type and Option Class, and then search for Instrument Set Controls having broader inclusive groups, for example, Instrument Type ALL.

In one aspect of the system and method of the present disclosure, a higher Compute Index number indicates more intensive calculation. In another aspect of the system and method of the present disclosure, among other factors, an Instrument Set Control may be selected for a Selected Instrument only when the Compute Index of the Selected Instrument is greater than or equal to the Compute Index of the Instrument Set Control.

In another aspect of the system and method of the present disclosure, in the event there is more than one eligible Instrument Set Control, then the Instrument Set Control having the highest Compute Index will be chosen for the Selected Instrument.

As shown in Table 1, Instrument Set Control 1 may be chosen for instruments of Instrument Type All, Option Class Null, and which have a Compute Index of 0 or greater. Instrument Set Control 2 may be chosen for instruments of Instrument Type OTC, Option Class Vanilla, and which have a Compute Index of 1 or greater. Instrument Set Control 3 may be chosen for instruments of Instrument Type OTC, Option Class Vanilla, and which have a Compute Index of 5 or greater.

In one example, if an instrument of Instrument Type OTC, Option Class Rainbow (RBW), and Compute Index 1 were presented, then based on information in the Instrument Set Control Table 108, Instrument Set Control 1 would be chosen, as it provides for OTC instruments of all Option Classes, and the Compute Index of the Selected Instrument is greater than the Compute Index of the Instrument Set Control. One reason Instrument Set Controls 2 and 3 are not candidates for this instrument is that they do not provide for instruments having Option Class RBW. Instrument Set Control 1 in this example may be considered the "default" as it may be used for all Instrument Types, Option Types, and all Compute Indexes.

In another example, if an instrument of Instrument Type OTC, Option Class Vanilla (VAN), and Compute Index 6 were presented, then based on information in the Instrument Set Control Table 108, Instrument Set Control 3 will be chosen as it provides for OTC instruments of Option Class VAN, and the Compute Index of the instrument is greater than the Compute Index of the Instrument Set Control. In this example, one reason Instrument Set Control 1 is not used is because another applicable Instrument Set Control having a higher Compute Index exists. Another reason Instrument Set Control 1 is not used is because another candidate Instrument Set Control having an exact Instrument Type and Option Class match exists. While Instrument Set Control 2 may handle the instrument, that Instrument Set Control is not used because an Instrument Set Control 3 is capable of handing the Instrument type and Option Class and has a higher Compute Index.

In Step S204, after an Instrument Set Control is chosen for the Selected Instrument, the Scheduler 100 may find an appropriate Calculation Control based on the Selected Context 104 supplied in the Request 102 using Calculation Control for Instrument Set Control Table 112.

In one aspect of the system and method of the presently claimed invention, Context may not be used, and Calculation Control will be automatically determined once an Instrument Set Control is chosen.

Calculation Control may be a predefined group of one or more calculation types which may be performed. In one aspect of the system and method of the present disclosure, an example of calculation types may be sensitivities, or "Greeks", for financial instruments. One example of a Greek is a "Delta" calculation, which is the change of value for a one point movement of the underlying instrument. In one aspect of the system and method of the present disclosure, an example of calculation types may be price and compute time. One or more such calculation types may be grouped and referred to as Calculation Controls which may have, for example, a Calculation Control ID number, as shown in Table 2 below. Calculation Controls may include one or more calculation type, and a calculation type may be included in one or more Calculation Control. Calculation Controls may represent a group of calculation types and may be split into smaller subset Calculation Controls having a subset of calculation types in order to affect processing times.

An example of Calculation Controls, listed by Calculation Control ID are listed in Table 2.

TABLE 2

Calculation Control Types

| Calculation Control ID | Calculation Type |
| --- | --- |
| 1000 | Delta |
| 1000 | Gamma |
| 1000 | Vega |
| 1001 | X-Gamma |
| 1002 | Delta |
| 1002 | Gamma |
| 1002 | Vega |
| 1002 | X-Gamma |

As shown, for example, in Table 2, Calculation Control 1002 contains four Calculation Types Delta, Gamma, Vega, and X-Gamma. Calculation Control 1002 may be split, for example, into Calculation Control 1000 including Delta, Gamma, and Vega, and Calculation Control 1001 including X-Gamma.

Each Instrument Set Control may have one or more associated Calculation Control for each one or more associated Context as shown in Calculation Control for Instrument Set Control Table 112, shown in Table 3, which includes Valuation Pool ID, Context, Calculation Control, maximum number of instruments which may be included per Job, and Job Rank for each Instrument Set Control.

TABLE 3

Calculation Control for Instrument Set Control ID Table

| Instrument Set Control ID | Valuation Pool ID | Context | Calculation Control | Max Number of Instruments | Job Rank |
| --- | --- | --- | --- | --- | --- |
| 1 | 2 | End of Day | 1002 | 50 | 20 |
| 1 | 2 | Overnight | 1002 | 200 | 10 |
| 2 | 2 | End of Day | 1002 | 100 | 15 |
| 3 | 1 | Overnight | 1000 | 5 | 3 |
| 3 | 2 | Overnight | 1001 | 5 | 6 |

Once an Instrument Set Control has been is chosen, the Scheduler 100 chooses the Selected Context 104 received in the Request 102 in Step S200 from the available Contexts for the chosen Instrument Set Control.

In the example shown in Table 3, two Contexts are supported for Instrument Set Control 1, "End of Day" and "Overnight". A Selected Instrument of Instrument Set Control 1, Context "End of Day" will be added to a Job to perform Calculation Control 1002 on a maximum of 50 instruments on Valuation Pool ID 2 with a Job Rank of 20. A Selected Instrument of Instrument Set Control 1, Context "Overnight" will be added to a Job to perform Calculation Control 1002 on a maximum of 200 instruments on Valuation Pool ID 2 with a Job Rank of 10.

As shown in Table 3, a Selected Instrument of Instrument Set Control 3, Context "Overnight" may be split into two entries, each entry having one or more Calculation Controls. The first entry for the Selected Instrument of Instrument Set Control 3, Context "Overnight", shown in Table 3 Row 4, will be added to a Job to perform Calculation Control 1000 on a maximum of 5 instruments on Valuation Pool ID 1 with a Job Rank of 3. The second entry for the Selected Instrument of Instrument Set Control 3, Context "Overnight", shown in Table 3 row 5, will be added to a Job to perform Calculation Control 1001 on a maximum of 5 instruments on Valuation Pool ID 5 with a Job Rank of 6.

In Step S206, the Scheduler 100 may assign and create Jobs for Selected Instruments.

A Job may include, for example, Instrument ID for the Selected Instrument, Context, and Calculation Control. Other data used by the Valuation Engine 126, for example, market data, may be determined by the Valuation Engine 126 based on information included in the Job and may be retrieved from Database 116.

In one aspect of the system and method of the present disclosure, the following rules for assigning a Selected Instrument to a Job may apply: if there are no Jobs, then create a new Job capable of processing the Selected Instrument and add the Selected Instrument to that Job. If there is a Job capable of handling the Selected Instrument and the Job has not reached its maximum instrument capacity, then add the Selected Instrument to this Job; otherwise create a new Job and add the Selected Instrument to it.

In Step S208, once one or more Selected Instruments have been assigned Jobs, then the Jobs may be sorted into order by Job Rank and placed into a Pool Scheduling Queue 118 by a Pool Scheduler 120.

A Job Rank may be a number relating to the priority of order in which a Job may be processed. In one aspect of the system and method of the present disclosure, a Job having a lower Job Rank will be processed before a Job having a higher Job Rank.

Valuation Engines 126, for example, Financial Instrument Valuation Engines, which may be run on one or more CPU's distributed across one or more computer host machines and may be available at one or more times of day. A Valuation Pool 128 may be referred to by a corresponding Valuation Pool ID number as shown in Table 4 below.

In the example shown in Table 4, Host Computer 2 has ten Valuation Engines 126 total, eight of which are grouped in Valuation Pool ID 2 and the remaining two are grouped in Valuation Pool ID 3. In one aspect of the system and method of the present disclosure, the number of Valuation Engines 126 may be less than the number of CPU's on a host computer.

TABLE 4

Calculation Pools Table

| Valuation Pool ID | Host ID | Number of Engines |
|---|---|---|
| 1 | Host Computer 1 | 10 |
| 2 | Host Computer 2 | 8 |
| 3 | Host Computer 2 | 2 |

In Step S210, the Pool Scheduler 120 may select the Jobs from the Pool Scheduling Queue 118 and place each Job in the correct Valuation Pool Queue 122. The Pool Scheduler 120 may receive information about the Valuation Engine 126 regarding Job status via a Valuation Manager 124 and may receive processing updates, for example, when processing is completed.

In Step S212, Valuation Manager 124 selects Jobs from the Valuation Pool Queue 122 and sends them to the Valuation Engine 126. The Job may include the batch of Selected Instruments as well as any other Instrument Information needed for processing the Job, for example, prices, date.

In one aspect of the system and method of the present disclosure, a Valuation Engine 126 may be used to process calculation types. A Valuation Engine 126 may spread across one or more host computers and host computers may contain one or more Valuation Engines 126.

The Valuation Manager 124 may access information about the Valuation Engine 126. For each Valuation Pool 128 there may be a definition of the Valuation Engines 126 available including technical details of the host and port for connection purposes. While processing a Job a Valuation Engine 126 is not longer available to receive additional Jobs. Once the Job is completed and a Result is created, then that Valuation Engine 126 may be available for further Jobs. Jobs may be taken off the Valuation Pool Queue 122 until all Valuation Engines 126 are active.

In Step S214, when a Valuation Engine 126 completes processing it may transmit the Result to the Scheduler 100 which may send the Result to storage, for example, in a Database 116, and another Job may be taken from the appropriate Valuation Pool Queue 122 for processing.

Numerous additional modifications and variations of the present disclosure are possible in view of the above-teachings. It is therefore to be understood that within the scope of the appended claims, the present disclosure may be practiced other than as specifically described herein.

The invention claimed is:

1. A non-transitory computer-readable medium storing instructions for causing a computer to implement a method for scheduling processing of an instrument, the method comprising:

receiving a processing request, the processing request including instrument information and a context that relates to the instrument information;

creating a hashmap that applies a hash function to the context to obtain a 32-bit hash value that provides an internal address used to associate the context with a valuation pool;

selecting an instrument type of the instrument based on the received instrument information, wherein the received instrument information includes a computational complexity of the instrument;

assigning an information set control from a plurality of instrument set controls associated with the instrument type based on a computational intensity of computing a valuation for the instrument and the context of the instrument;

assigning a calculation control associated with a plurality of calculation types based on the assigned information set control;

separating, based on a cached configuration of the scheduler, the instrument into jobs and assigning the instrument to a job corresponding to a calculation control;

placing each job into a pool scheduling queue, determining a corresponding valuation pool queue for each job in the pool scheduling queue by using the context to retrieve the valuation pool via the hashmap, and placing each job into the corresponding valuation pool queue, each valuation pool queue having corresponding processing engines; and selecting jobs from the valuation pool queue and transmitting each job to one of the multiple processing engines corresponding to the valuation pool queue for processing.

2. The non-transitory computer readable medium of claim 1, wherein the method further comprises creating a previously presented job when the job corresponding to the calculation control does not exist.

3. The non-transitory computer readable medium of claim 1, wherein the instrument information includes the computational intensity of computing the valuation for the instrument.

4. The non-transitory computer readable medium of claim 1, wherein the method further comprises transmitting the job to the processing engine in an order according to a job priority based on the calculation control.

5. The non-transitory computer readable medium of claim 1, wherein the calculation control includes at least one financial calculation.

6. The non-transitory computer readable medium of claim 1, wherein the processing engines operate across one or more CPUs.

7. The non-transitory computer readable medium of claim 1, wherein at least one processing engine is associated with the calculation control.

8. The non-transitory computer readable medium of claim 1, wherein the calculation control includes at least two calculation sub-sets, each calculation sub-set having a job priority, and wherein the method further comprises assigning the instrument to at least two jobs corresponding to each of the at least two calculation sub-sets.

9. The non-transitory computer readable medium of claim 8, wherein the transmitter transmits the at least two jobs to the processing engines in an order according to the job priority.

10. A method for scheduling processing of an instrument across multiple processing engines, the method comprising:
   receiving a processing request, the processing request including instrument information and a context that relates to the instrument information;
   creating a hashmap that applies a hash function to the context to obtain a 32-bit hash value that provides an internal address used to associate the context with a valuation pool;
   selecting an instrument type of the instrument based on the received instrument information, wherein the received instrument information includes a computational complexity of the instrument;
   assigning an information set control from a plurality of instrument set controls associated with the instrument type based on a computational intensity of computing a valuation for the instrument and a context of the instrument;
   assigning a calculation control associated with a plurality of calculation types based on the assigned information set control;
   separating the instrument into jobs and assigns the instrument to a job corresponding to a calculation control;
   placing each job into a pool scheduling queue, determining a corresponding valuation pool queue for each job in the pool scheduling queue by using the context to retrieve the valuation pool via the hashmap, and placing each job into the corresponding valuation pool queue, each valuation pool queue having corresponding processing engines; and
   selecting jobs from the valuation pool queue for transmitting each job to one of the multiple processing engines corresponding to the valuation pool queue for processing.

11. The method of claim 10, wherein assigning the calculation control further comprises creating a previously presented job when the job corresponding to the calculation control does not exist.

12. The method of claim 10, wherein the instrument information includes the computational intensity of computing the valuation for the instrument.

13. The method of claim 10, further comprising transmitting the job to the processing engines in an order according to a job priority based on the calculation tool.

14. The method of claim 10, wherein the calculation control includes at least one financial calculation.

15. The method of claim 10, wherein the processing engines operate across one or more CPUs.

16. The method of claim 10, wherein at least one processing engine is associated with the calculation control.

17. The method of claim 10, wherein the calculation control includes at least two calculation sub-sets, each calculation sub-set having a job priority, and wherein the method further comprises assigning the instrument to at least two jobs corresponding to each of the at least two calculation sub-sets.

18. The method of claim 10, further comprising transmitting at least two jobs to the processing engine in an order according to the job priority.

19. A system for scheduling processing of an instrument across multiple processing engines, the system comprising:
   a central processing unit configured to:
   receive a processing request, the processing request including instrument information and a context that relates to the instrument information;
   create a hashmap that applies a hash function to the context to obtain a 32-bit hash value that provides an internal address used to associate the context with a valuation pool;
   select an instrument type of the instrument based on the received instrument information, wherein the received instrument information includes a computational complexity of the instrument;
   assign an information set control from a plurality of instrument set controls associated with the instrument type based on a computational intensity of computing a valuation for the instrument and a context of the instrument;
   assign a calculation control associated with a plurality of calculation types based on the assigned information set control;
   separate, based on a cached configuration of the system, the instrument into jobs and assign a portion of the instrument to a job corresponding to a calculation control;
   place each job into a pool scheduling queue, determine a corresponding valuation pool queue for each job in the pool scheduling queue by using the context to retrieve the valuation pool via the hashmap, and place each job into the corresponding valuation pool queue, each valuation pool queue having corresponding processing engines; and
   select jobs from the valuation pool queue and transmit each job to one of the multiple processing engines corresponding to the valuation pool queue for processing.

20. The system of claim 19, wherein the valuation pool queue comprises a plurality of valuation pools stored in the hashmap.

\* \* \* \* \*